(12) United States Patent
Muramatsu

(10) Patent No.: US 8,154,767 B2
(45) Date of Patent: Apr. 10, 2012

(54) IMAGE PROCESSING APPARATUS AND IMAGE PROCESSING METHOD WITH COLOR SHIFT CORRECTION

(75) Inventor: Mizuki Muramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 11/741,802

(22) Filed: Apr. 30, 2007

(65) Prior Publication Data

US 2007/0258103 A1    Nov. 8, 2007

(30) Foreign Application Priority Data

May 2, 2006    (JP) ................................. 2006-128509

(51) Int. Cl.
*G06F 15/00*    (2006.01)
(52) U.S. Cl. ........................................ 358/3.06; 358/1.9
(58) Field of Classification Search ................. 358/3.06, 358/1.9
See application file for complete search history.

(56) References Cited

U.S. PATENT DOCUMENTS

| 5,715,498 A | 2/1998 | Takeuchi et al. ................. 399/40 |
| 7,619,775 B2 * | 11/2009 | Kitamura et al. ............... 358/1.9 |
| 7,724,397 B2 * | 5/2010 | Lee et al. ..................... 358/3.26 |
| 2004/0008208 A1 * | 1/2004 | Dresevic et al. .............. 345/589 |
| 2007/0047031 A1 * | 3/2007 | Kaltenbach et al. .......... 358/504 |

FOREIGN PATENT DOCUMENTS

| JP | 8-085237 | 4/1996 |
| JP | 2002-116394 | 4/2002 |
| JP | 2003-241131 | 8/2003 |
| JP | 2004-170755 | 6/2004 |

* cited by examiner

*Primary Examiner* — Benny Tieu
*Assistant Examiner* — Qian Yang
(74) *Attorney, Agent, or Firm* — Fitzpatrick, Cella, Harper & Scinto

(57) ABSTRACT

Image formation free from quality degradation is achieved by selecting whether to perform correction of color shift before or after a halftone process. When the amount of color shift is determined as larger than a predetermined threshold value, the halftone process is executed before a color shift correction process. On the other hand, when the amount of color shift is determined as equal to or smaller than the predetermined threshold value, the halftone process is executed after the color shift correction process. That is, with the large amount of color shift, the image degradation as a result of not being able to keep the number of screen lines when the correction of color shift is performed before the halftone process looks more conspicuous than the case with the correction of color shift after the halftone process.

4 Claims, 18 Drawing Sheets

|   | AREA  | WIDTH (mm) | SLOPE (mm) |
|---|-------|------------|------------|
| Y | AREA1 | L1         | m1         |
|   | AREA2 | L2         | m2         |
|   | AREA3 | L3         | m3         |
|   | AREA  | WIDTH (mm) | SLOPE (mm) |
| M | AREA1 | ...        | ...        |
|   | AREA2 | ...        | ...        |
|   | AREA3 | ...        | ...        |
|   | AREA  | WIDTH (mm) | SLOPE (mm) |
| C | AREA1 | ...        | ...        |
|   | AREA2 | ...        | ...        |
|   | AREA3 | ...        | ...        |
|   | AREA  | WIDTH (mm) | SLOPE (mm) |
| K | AREA1 | ...        | ...        |
|   | AREA2 | ...        | ...        |
|   | AREA3 | ...        | ...        |

FIG. 6

FIG.9A    DISPLACEMENT AMOUNT BY SLOPE
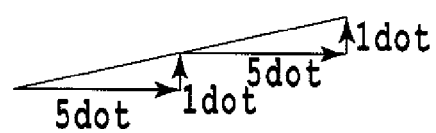
FIG.9B    BITMAP IMAGE (BEFORE CORRECTION OF GRADATION VALUE)
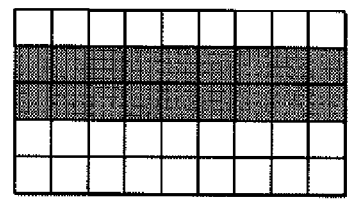
FIG.9C    BITMAP IMAGE AFTER CORRECTION
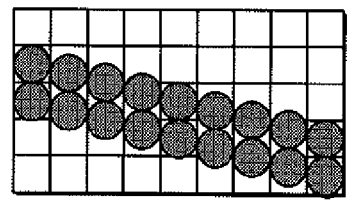
FIG.9D    GRADATION VALUE CONVERSION TABLE
| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| β=Δy−k | 0 | 0.25 | 0.5 | 0.75 | 0 | 0.25 | 0.5 | 0.75 | 0 |
| α=1−β | 1 | 0.75 | 0.5 | 0.25 | 1 | 0.75 | 0.5 | 0.25 | 1 |
FIG.9E    BITMAP IMAGE (AFTER CORRECTION OF GRADATION VALUE)
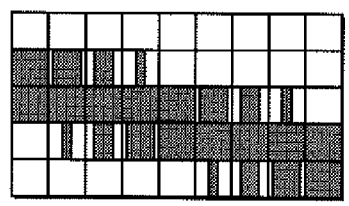
FIG.9F    LIGHT-EXPOSURE IMAGE
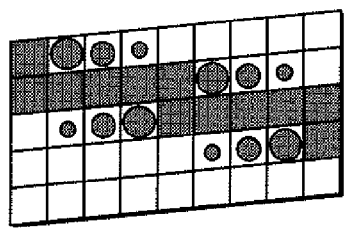

GRADATION VALUE
CONVERSION TABLE
(NO CORRECTION IS
PERFORMED FOR UNIT
SMALLER THAN ONE PIXEL)
| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| β=Δy−k | 0 | 0 | 0 | 0 | 0 | 0 | 0 | 0 | 0 |
| α=1−β | 1 | 1 | 1 | 1 | 1 | 1 | 1 | 1 | 1 |
FIG.10A
BITMAP IMAGE
(COORDINATE
CONVERSION ONLY)
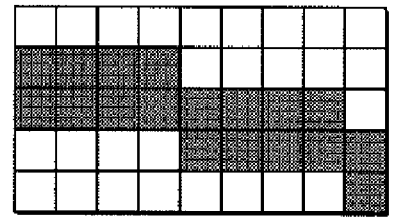
FIG.10B
LIGHT-EXPOSURE
IMAGE
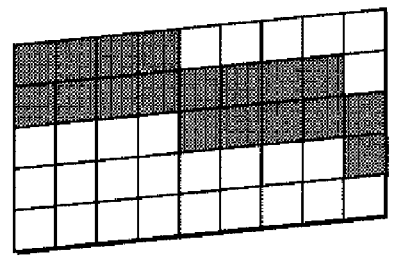
FIG.10C

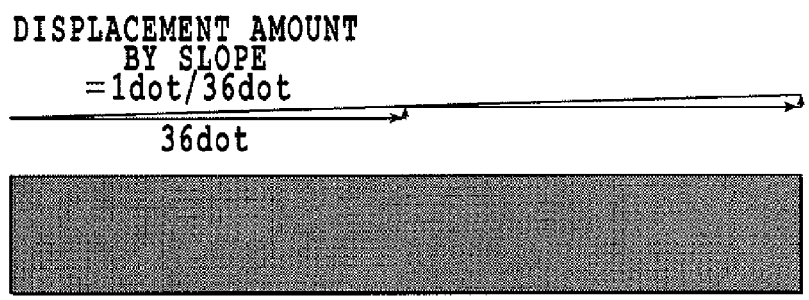
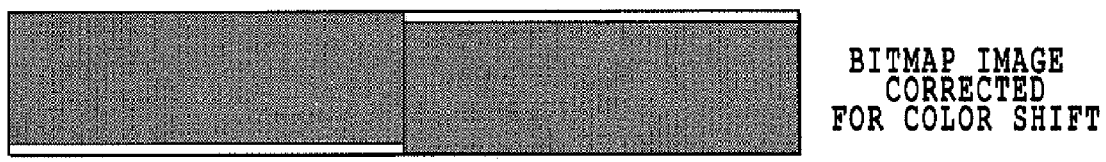
FIG.11A  BITMAP IMAGE
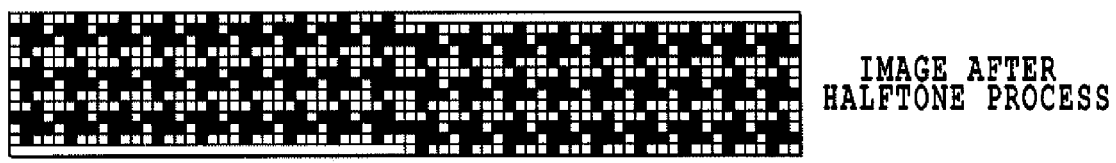
FIG.11B  BITMAP IMAGE CORRECTED FOR COLOR SHIFT
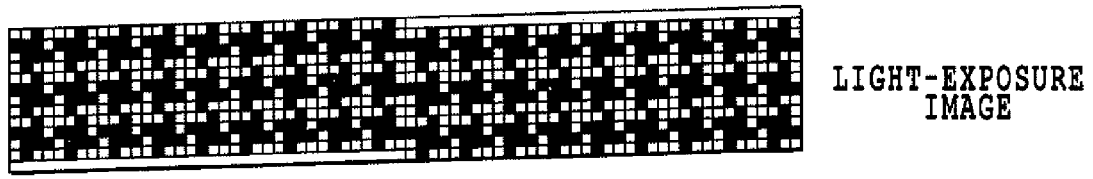
FIG.11C  IMAGE AFTER HALFTONE PROCESS
FIG.11D  LIGHT-EXPOSURE IMAGE

BITMAP IMAGE

IMAGE AFTER HALFTONE PROCESS

BITMAP IMAGE AFTER CORRECTION

LIGHT-EXPOSED IMAGE

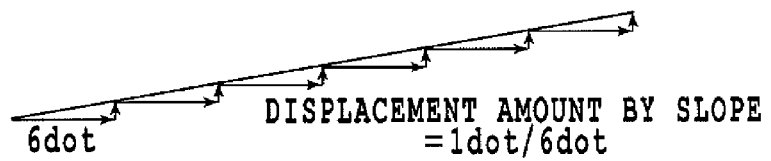
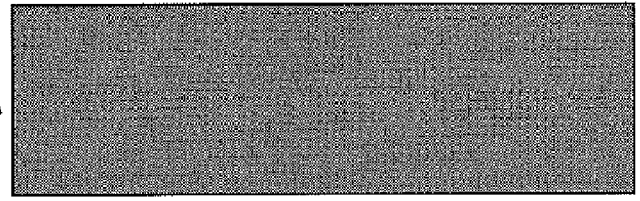
FIG.13A  BITMAP IMAGE
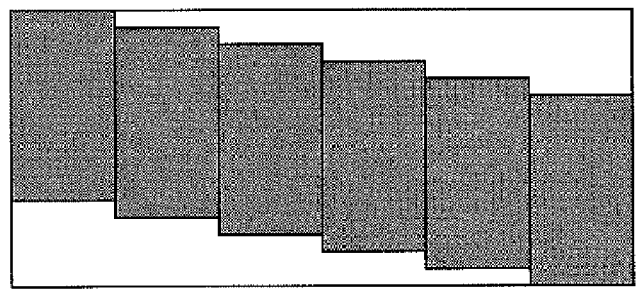
FIG.13B  BITMAP IMAGE AFTER CORRECTION
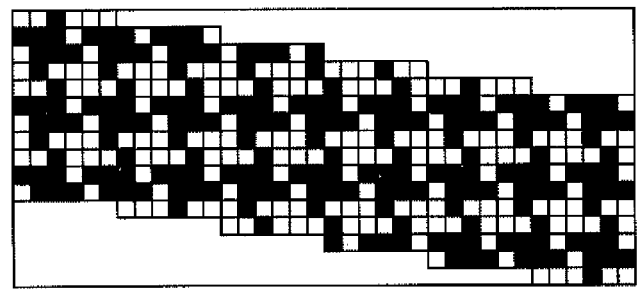
FIG.13C  IMAGE AFTER HALFTONE PROCESS
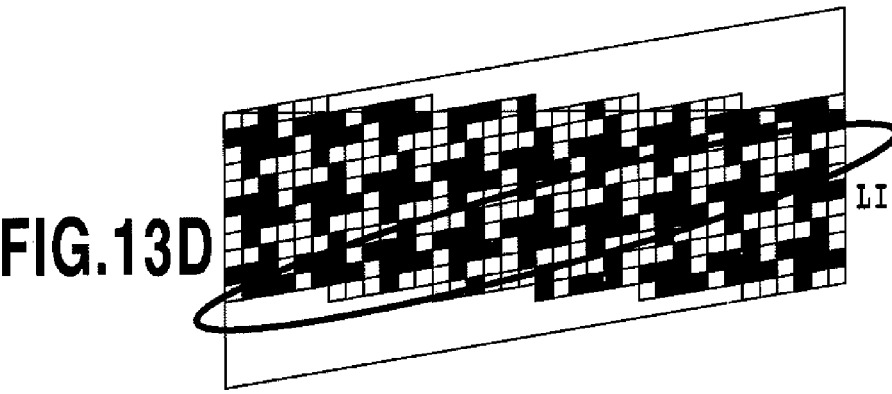
FIG.13D  LIGHT-EXPOSURE IMAGE
LARGE DEVIATION OF SCREEN ANGLE

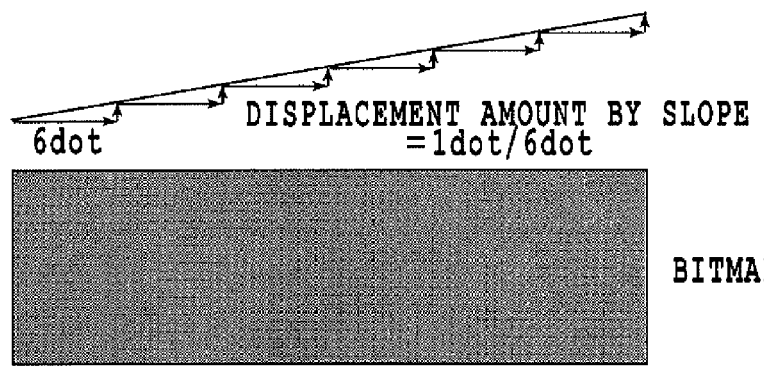
FIG.14A — BITMAP IMAGE
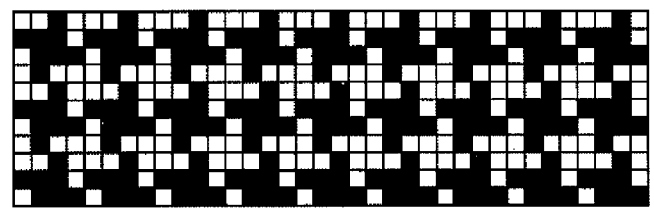
FIG.14B — IMAGE AFTER HALFTONE PROCESS
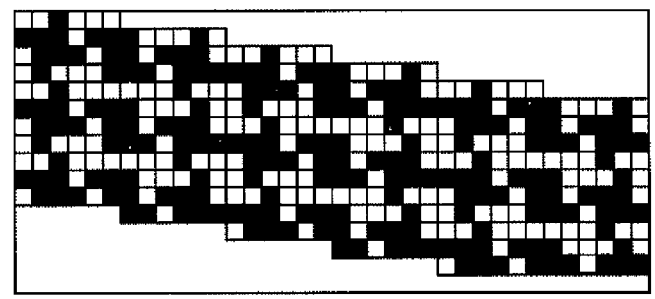
FIG.14C — BITMAP IMAGE CORRECTED FOR COLOR SHIFT
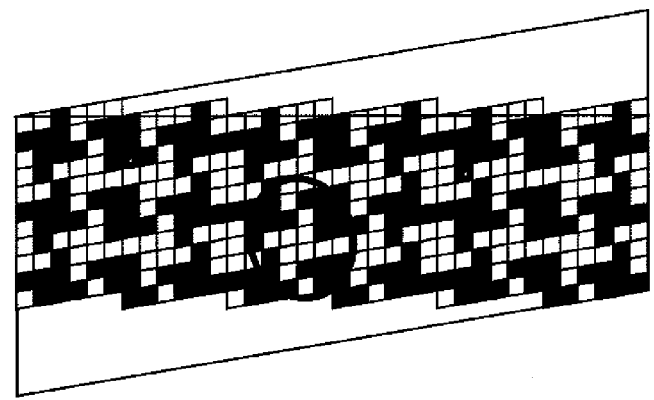
FIG.14D — LIGHT-EXPOSURE IMAGE
MISSING PERIODICITY OF DITHER

IMAGE PROCESSING APPARATUS AND IMAGE PROCESSING METHOD WITH COLOR SHIFT CORRECTION

BACKGROUND OF THE INVENTION

1. Field of the Invention

The present invention relates to an image processing apparatus and an image processing method, and more specifically, to correction of a formation position misalignment observed in an image formed in an electro-photographic development section or the like.

2. Description of the Related Art

In a recently provided electro-photographic color image formation apparatus is of a tandem type of color image formation apparatus, in which a development section including a development unit and a photoreceptor is equipped for each of plural types of color materials and images of different colors are sequentially on an image basis, transferred to an image transfer belt or a printing medium. With the development sections equipped for the respective color materials as such, image formation can be performed at high speed.

Although the time taken for image formation can be considerably reduced, such a tandem type has problems resulting from non-uniformity of a lens and position accuracy for attachment of the lens in a deflection scanning unit, and position accuracy for assembly of the deflection scanning unit itself to an image formation apparatus body. More specifically, when scanning lines on a photoreceptor are sloped or curved, and when the amount of slope or curve varies depending on the color, image formation positions of respective colors on a transfer paper may not be the same. As a result of this, the formed color image suffers from color shift due to formation position displacements among colors, and there thus is a problem of not being able to achieve the high quality for the color image.

As measures against such color shift, Japanese Patent Laid-Open No. 2002-116394 describes a method of measuring the amount of curve of scanning lines using an optical sensor in the assembly process of a deflection scanning unit, and adjusting, for fixation, the amount of curve of the scanning lines by mechanically rotating a lens. Japanese Patent Laid-Open No. 2003-241131 describes a method of measuring the amount of slope of scanning lines using an optical sensor in the assembly process of a deflection scanning unit to an image formation apparatus body, and adjusting, for fixation to the apparatus body, the slope of the scanning lines by mechanically tilting the deflection scanning unit.

For correcting an optical path in an optical system, there needs to mechanically operate components, such as an optical system including a light source and an f-θ lens and mirrors in the optical path, so as to achieve position alignment for a test toner image. As such, the methods of Japanese Patent Laid-Open No. 2002-116394 and Japanese Patent Laid-Open No. 2003-241131 both require a high-accuracy moving member, thereby causing a cost increase.

Another problem with such optical path correction in the optical system is that no frequent correction is adapted due to the long time before completion of the correction. The length deviation of the optical path is changed due to the influence of temperature increase possibly occurred to the apparatus. Therefore, even with correction making at some point in time, it is not possible to eliminate the influence of temperature increase occurring to the apparatus. In this sense, it is thus relatively difficult to prevent color shift through correction for the optical path in the optical system.

On the other hand, Japanese Patent Laid-Open No. 2004-170755 describes a method of measuring the amount of slope and curve of scanning lines using an optical sensor, and correcting bitmap image data so as to cancel out the measurement results. More specifically, by performing coordinate conversion of an output of bitmap data, and by adjusting a gradation value of neighbor pixels, an image is formed with any possible slope and curve so that the slope and curve occurring in the apparatus are cancelled out. As such, the method of Japanese Patent Laid-Open No. 2004-170755 is of electrically correcting the bitmap image data through image data processing. Therefore, in terms of not requiring a member for mechanical adjustment or an adjustment process at the time of assembly, the method of Japanese Patent Laid-Open No. 2004-170755 can deal with the color shift at lower cost than the methods of Japanese Patent Laid-Open No. 2002-116394 and Japanese Patent Laid-Open No. 2003-241131.

Japanese Patent Laid-Open No. 8-85237(1996) also describes a method of correcting any color shift similarly to that of Japanese Patent Laid-Open No. 2004-170755. More specifically, this method executes image processing such as a color process and a halftone process to form raster image data on a bitmap memory for each of color components (C (cyan), M (magenta), Y (yellow), and K (black)). Then, the method converts output coordinates of the respective color image data into the output coordinates which has been subjected to a correction for registration deviation. Further, a light beam being a modulation result based on each of the conversion results, i.e., image data, is then corrected in units smaller than the minimum dot unit of a color signal.

However, if the corrections of color shift described in Japanese Patent Laid-Open Nos. 2004-170755 and 8-85237 (1996) are simply performed at some point in the image processing process, the resulting images formed thereby may suffer from quality degradation contrary to expectations.

The correction of color shift is, as described in the methods of Japanese Patent Laid-Open Nos. 2004-170755 and 8-85237(1996), generally applied to image data that has been subjected to a halftone process. In the resulting image, halftone dots in the halftone image may show poor reproducibility due to the conversion of output coordinates and correction performed in units smaller than the minimum dot, thereby causing irregular color such as moiré.

FIG. 1 is a diagram illustrating such problems, and shows correction in units smaller than the minimum dot unit. An input image 101 is constant in density value (50%). The input image 101 is subjected to the correction of color shift in which an adjustment of gradation values around the minimum dot so as to execute data correction in units smaller than the minimum dot unit, as described in Japanese Patent Laid-Open Nos. 2004-170755 and 8-85237(1996). The resulting image data corrected as such is used as a basis for forming an image 102. The exemplary image 102 in FIG. 1 is the result corrected for color shift, in which the gradation value is shifted more in the righter side so as to accommodate the slope or the like of the scanning lines. More specifically, the image 102 formed based on the correction shows a line directed toward the upper right, and indicates that the color shift toward the upper left is cancelled out. With such data correction in units smaller than the minimum dot or conversion of output coordinates, halftone dots in the resulting halftone image may partially suffers from degradation of reproducibility, and thus a linear relationship can not be kept between density values of an image and density values of an image formed based thereon. If this is the case, even if the input image 101 is constant in density, an image formed based on the image data corrected for color shift may not be constant in density value.

If such a density variation appears periodically, moiré problems become evident, and the resulting color image is not satisfactory.

On the other hand, it is considered that the correction of color shift may be performed before the halftone process. This, however, may cause a problem of not being able to keep the number of screen lines that are originally supposed to be processed due to a considerable angle deviation in a screen pattern, depending on an amount of color shift, then the quality degradation caused by not being able to keep the number of screen lines becomes more evident compared with the above case with the moiré problems.

In addition, a filtering process such as edge detection or smoothing is affected by the correction of color shift. On the other hand, the smoothing is generally required to be performed with higher accuracy if with an image high in output resolution. From this point of view, if with a high output resolution, when image data through with halftone processing is corrected for the color shift, the conversion of output coordinates accompanying therewith or the like prevents the filtering process from increasing in accuracy.

Further, a rendering processor the like is considered desirable if selectively performed to either halftone-processed image data or not-yet-halftone-processed image data, depending on as to whether quality of the output image comes first or speed increase and memory saving for the output image come first. In this case, it is desirable to perform correction of color shift depending on a mode for rendering, that is, if quality comes first in the mode, the correction of color shift is performed in the corresponding manner.

SUMMARY OF THE INVENTION

An object of the present invention is to provide an image processing apparatus and an image processing method which form an image free from quality degradation by selectively performing correction of formation position misalignment before or after a halftone process.

In the first aspect of the present invention, there is provided an image processing apparatus performing processes including a formation position correction process for correcting formation positions of an image by image forming means and a halftone process for quantizing image data, said apparatus comprising: acquisition means for acquiring a value of factor that affects a quality of formed image; determination means for determining whether to execute the formation position correction process before or after the halftone process, based on the acquired value of factor; control means for controlling the formation position correction process in accordance with the determination so that the formation position correction process is executed before or after the halftone process.

In the second aspect of the present invention, there is provided an image processing method of performing processes including a formation position correction process for correcting formation positions of an image by image forming means and a halftone process for quantizing image data, said method comprising: an acquisition step for acquiring a value of factor that affects a quality of formed image; a determination step for determining whether to execute the formation position correction process before or after the halftone process, based on the acquired value of factor; a control step for controlling the formation position correction process in accordance with the determination so that the formation position correction process is executed before or after the halftone process.

With the above configuration, it is determined whether to execute a formation position correction process before or after a halftone process, based on values of factors influencing the quality of the image formed such as the amount of formation position misalignment in the image formation means, the resolution of image formation, and the number of gradation levels for quantization in the halftone process. This thus enables to form an image free from quality degradation that is caused by imply performing the formation position correction process before or after the halftone process.

Further features of the present invention will become apparent from the following description of exemplary embodiments (with reference to the attached drawings).

BRIEF DESCRIPTION OF THE DRAWINGS

FIG. 6 is a diagram showing exemplary profile information for storage in a color shift amount storage section 212;

FIGS. 9A to 9F are diagrams for illustrating a correction process performed in units smaller than a pixel in a gradation value conversion section;

FIGS. 10A to 10C are diagrams showing a gradation value conversion table in a case where no correction is performed in units smaller than a pixel;

FIGS. 11A to 11D are diagrams showing a bitmap image corrected for color shift before a halftone process when the color shift is not that much conspicuous;

FIGS. 13A to 13D are diagrams showing an exemplary bitmap image corrected for color shift before the halftone process when the color shift is conspicuous;

FIGS. 14A to 14D are diagrams showing an exemplary bitmap image corrected for color shift after the halftone process when the color shift is conspicuous;

DESCRIPTION OF THE EMBODIMENTS

Embodiments of the invention will be described below in detail with referring to the accompanying drawings. Exemplified below as an image formation apparatus of the embodiments in the present invention is a color laser printer in which color materials are various color of toners, i.e., C, M, Y, and K.

The present invention is surely not restrictive thereto, and various other applications are possible without departing from the scope of the invention, e.g., electro-photographic image formation apparatus using toners such as arbitrary color digital electro-photographic copier or color facsimile machine.

First Embodiment

Figure 1:
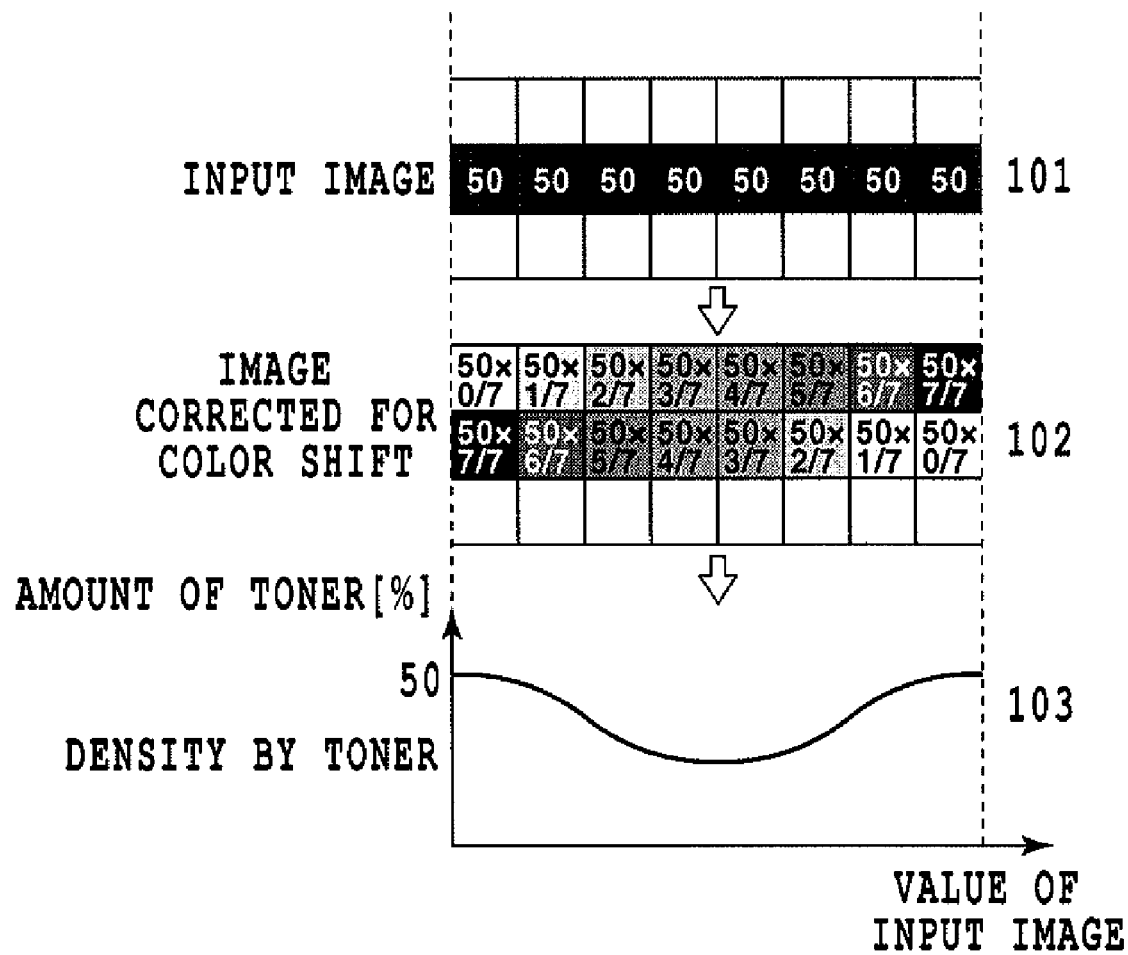
FIG. 1 is a diagram for illustrating density variations observed in a fine image as a result of correction of color shift in units smaller than a pixel.
Figure 2:
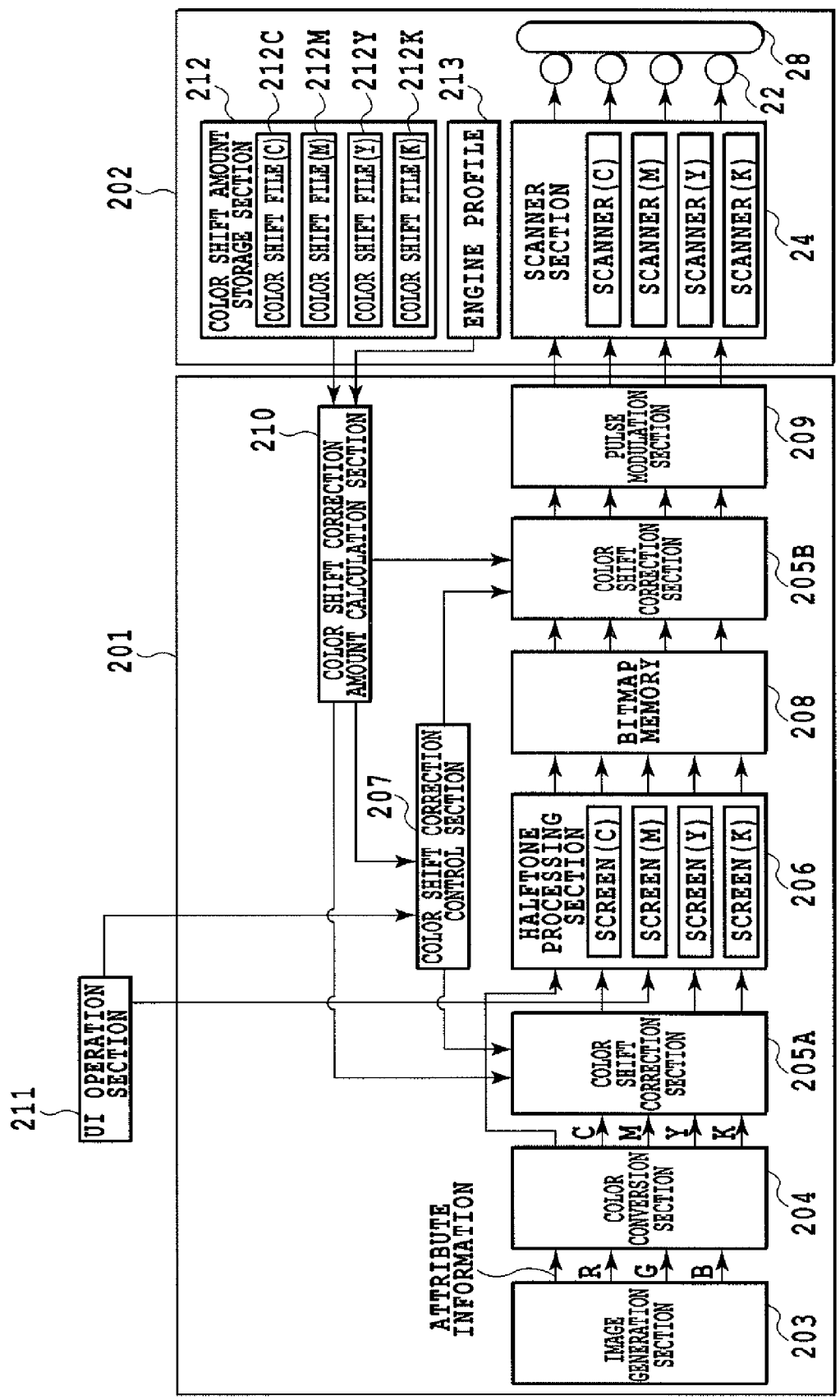
FIG. 2 is a block diagram showing the configuration of an image formation apparatus in an embodiment of the invention.

FIG. 2 is a block diagram showing the image formation configuration of an image formation apparatus according to a first embodiment of the present invention. As shown in FIG. 2, the image formation apparatus of the first embodiment is configured to include an image processing section 201 and an image formation section 202. The image processing section 201 generates bitmap image data, and then executes a series of processes such as a halftone process for the image data. Based on image data being the process result, the image formation section 202 then forms an image to a printing medium.

Image Formation Section

Figure 3:
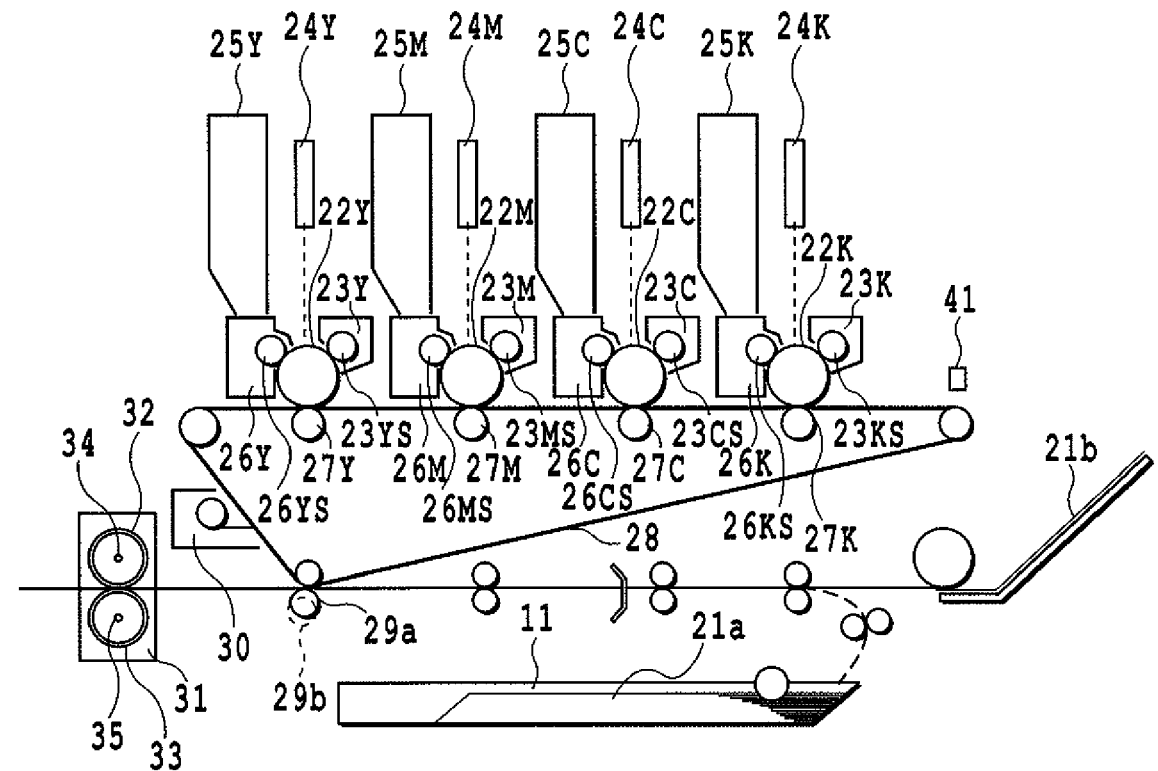
FIG. 3 is a cross sectional view of the color image formation apparatus of FIG. 2, showing the mechanical configuration thereof.

FIG. 3 is a view showing the mechanical configuration of the image formation section 202. As shown in the drawing, the image formation section 202 is of a tandem type using an intermediate transfer body, i.e., belt, 28. The image formation section 202 forms an electrostatic latent image by controlling and driving the light exposure in accordance with the light exposure time indicated by image data supplied from the image processing section 201, and then forms toner images of respective colors by developing the electrostatic latent image. Then, the section 202 causes toner images of respective colors to be overlaid together so that the toner image of a multicolor is formed, and transfers the multicolor toner image to a printing medium 11. The resulting transferred image on the printing medium is then subjected to a fixing process. Stations of the colors of yellow (Y), magenta (M), cyan (C), and black (K) are each configured as below.

An electric charging unit includes four injection chargers 23Y, 23M, 23C, and 23K to electrically charge photoreceptors 22Y, 22M, 22C, and 22K, respectively. The injection chargers are provided with sleeves 23YS, 23MS, 23CS, and 23KS, respectively.

The photoreceptors 22Y, 22M, 22C, and 22K are each configured by an organic photoconductive layer coated around an aluminum cylinder, and are rotated in response to a driving force coming from a drive motor that is not shown. The drive motor rotates the photoreceptors 22Y, 22M, 22C, and 22K in a counterclockwise direction in accordance with the operation of image formation.

A light exposure unit directs an exposure light from scanner sections 24Y, 24M, 24C, and 24K toward the photoreceptors 22Y, 22M, 22C, and 22K, and selectively exposes, to the light, the surfaces of the photoreceptors so that electrostatic latent images are formed.

A development unit is provided, for developing the colors of yellow (M), magenta (M), cyan (C), and black (K), with four developments 26Y, 26M, 26C, and 26K for the stations, respectively, for use to make visible the electrostatic latent images. The developments are provided with sleeves 26YS, 26MS, 26CS, and 26KS, respectively. Note here that the developments 26Y, 26M, 26C, and 26K can be all attachable and removable.

A transfer unit rotates the intermediate transfer body 28 in a clockwise direction for transferring a single-color toner image from each of the photoreceptors 22 to the intermediate transfer body 28. The single-color toner images are then transferred with the rotation of the photoreceptors 22Y, 22M, 22C, and 22K and primary transfer rollers 27Y, 27M, 27C, and 27K. The primary transfer rollers 27 are those disposed opposing the photoreceptors 22.

The transfer of the single-color toner images onto the intermediate transfer body 28 is completed with efficiency with application of an appropriate bias voltage to the primary transfer rollers 27, and with the rotation speed of the photoreceptors 22 different from that of the intermediate transfer body 28. Such an image transfer is referred to as primary transfer.

The transfer unit puts together the single-color images on the intermediate transfer body 28 on a station basis, and forwards the resulting multi-color toner image to a secondary transfer roller 29 with the rotation of the intermediate transfer body 28. The transfer unit also pinches the printing medium 11 for transfer from a paper-feed tray 21 (a, b) to the secondary transfer roller 29. To the printing medium 11, the multitoner image on the intermediate transfer body 28 is then transferred. This secondary transfer roller 29 is applied with a bias voltage of an appropriate level so that the toner image is electrostatically transferred. This is referred to as secondary transfer. While transferring the multi-color toner image onto the printing medium 11, the secondary transfer roller 29 is abutting the printing medium 11 at a position 29a, and is moved to a position 29b after the image transfer is completed.

The fixing unit is provided with a fixing roller 32 for heating the printing medium 11, and a pressure roller 33 for tightly pressing the printing medium 11 against the fixing roller 32. This is aimed to heat fuse the multicolor toner image to the printing medium 11 after image transfer to the printing medium 11. The fixing roller 32 and the pressure roller 33 are both formed hollow, and carry therein heaters 34 and 35, respectively. A fixing device 31 serves to transfer the printing medium 11 with the multicolor toner image using the fixing roller 32 and the pressure roller 33, and fixes the toner to the printing medium 11 with application of heat and pressure.

The toner-fused printing medium 11 is then ejected onto a paper-ejection tray (not shown) by a paper-ejection roller (not shown), and the image formation operation is ended.

A cleaning unit 30 cleans, if any, the toner left on the intermediate transfer body 28. After the four-colored multicolor toner image on the intermediate transfer body 28 is transferred to the printing medium 11, the waste toner left on the intermediate transfer body 28 is stored in a cleaner container.

A detection sensor 41 for use to detect color shift is disposed at a position opposing the intermediate transfer body 28. Patches for detection of color shift are formed on the intermediate transfer body 28 and the detection sensor 41 is used to detect the patches. This allows the amount of color shift for each color to be obtained on the basis of detection timing for the patches by the detection sensor 41.

Figure 4:
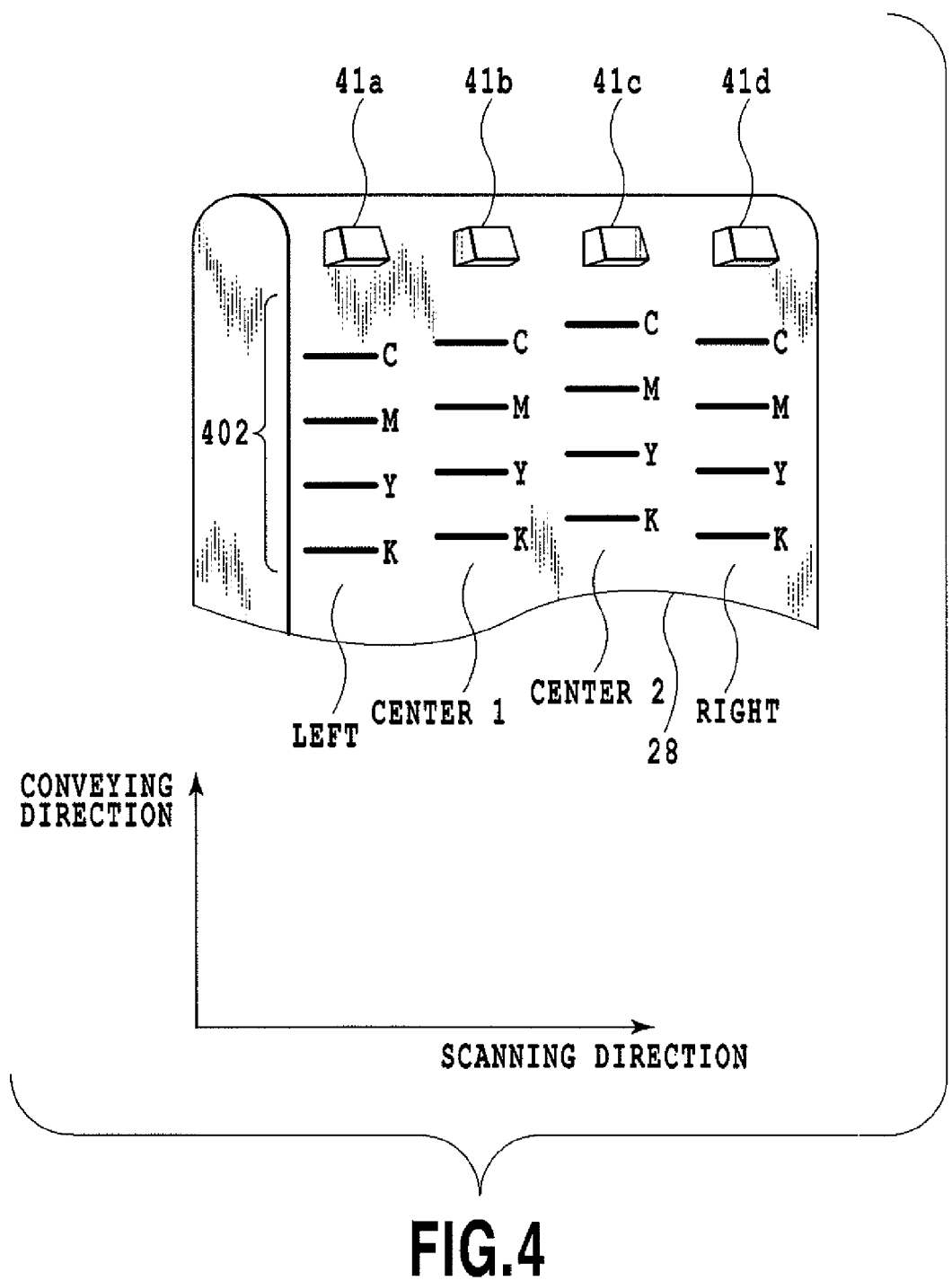
FIG. 4 is a diagram for illustrating the configuration for detection of color shift.

FIG. 4 is a diagram for illustrating detection of color shift in this embodiment. Above the intermediate transfer body 28, four detection sensors 41a, 41b, 41c, and 41d for use to detect color shift are provided along a scanning direction. On the intermediate transfer body 28, patches 402 for use to detect color shift for each of the colors of C, M, Y, and K are formed. When the intermediate transfer body 28 is moved in a conveying direction, the patches 402 for detection of the color shift for each color pass below the respective detection sensors. The detection sensors 41 thus detect their corresponding patches 402.

More specifically, the patches 402 which are formed at four positions, i.e., left, center 1, center 2, and right, in the scanning direction, are detected with the detection sensors 41a, 41b, 41c, and 41d respectively, and the detection timings for the respective patches 402 are obtained. Based on the timings, under the control of a CPU that is not shown, the slope and curve of the scanning lines are defined. With some configuration of a color image formation apparatus, the detection sensors 41 are provided only at right and left portions, and with this being the case, only the slope of the scanning lines are defined.

Figure 5:
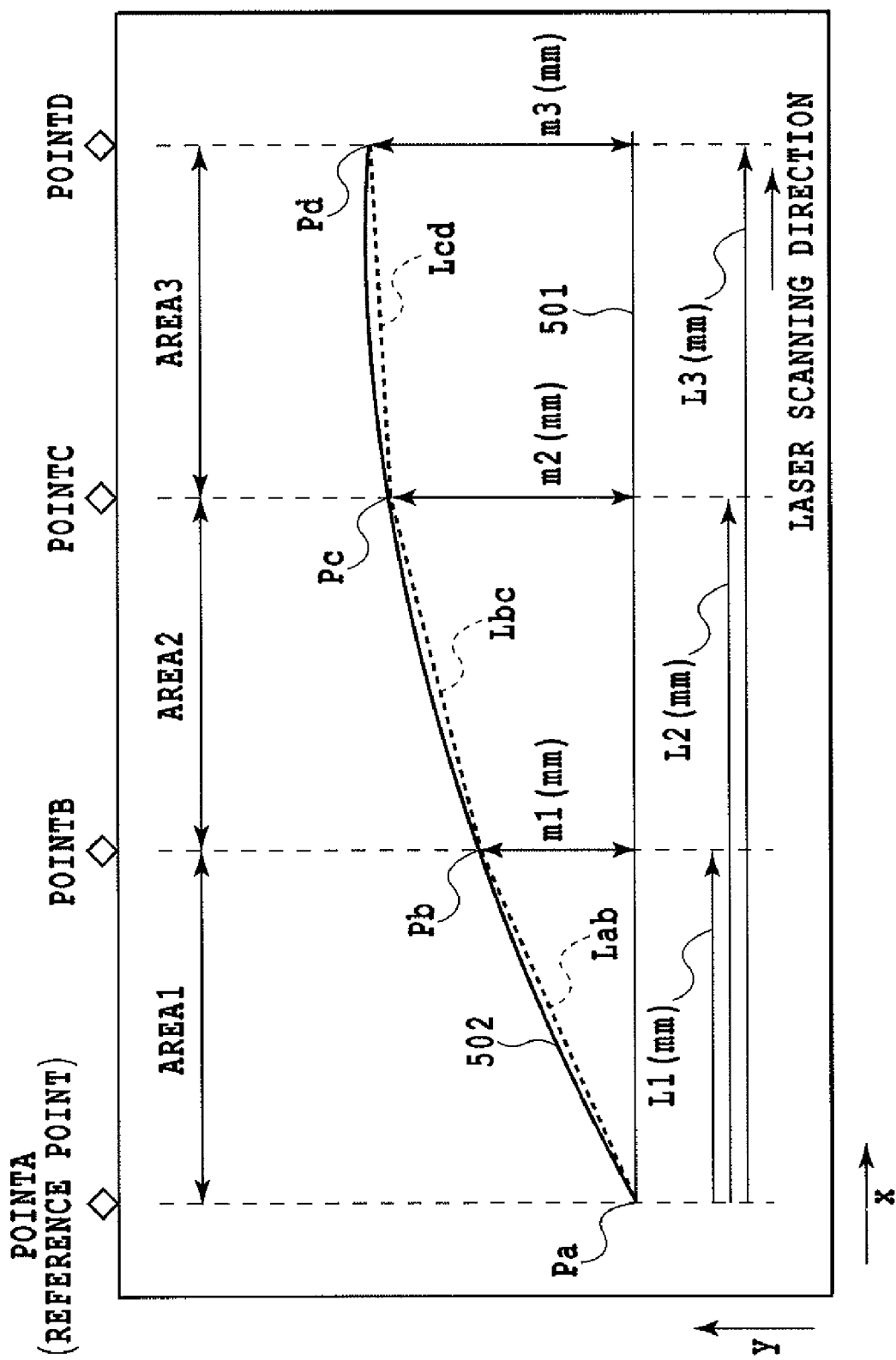
FIG. 5 is a diagram for illustrating correction of color shift observed in main scanning lines.

FIG. 5 is a diagram illustrating correction of color shift observed in main scanning lines. In the figure, a reference numeral 501 denotes an ideal scanning line with which scanning is performed along the direction vertical to the rotation direction of the photoreceptors 22. A reference numeral 502 denotes an actual scanning line that is sloped and curved due to the position accuracy and diameter deviation of the photoreceptors 22, and the position accuracy of an optical system in the scanner section 24 provided for each color. The main scanning direction, i.e., x direction, corresponds to the direction of laser scanning, and the sub scanning direction, i.e., y direction, corresponds to the conveying direction of a printing medium. When such slope and curve of the scanning lines vary among the image stations of C, M, Y, and K, a color shift occurs in an image on the intermediate transfer body 28 being a transfer result of toner images of all colors.

Assuming that a point A in an image formation area from which the scanning starts is a reference point (Pa). The amount of deviation (m1, m2, and m3), in the sub scanning direction, i.e., y direction, between the ideal scanning lien 501 and the actual scanning line 502 are measured at a plurality of points (B, C, and D) along the main scanning direction. Points corresponding to these measured points on the scanning line 502 are Pb, Pc, and Pd.

The area in the main scanning direction, i.e., X direction, is partitioned into an area 1 (between points Pa and Pb), an area 2 (between points Pb and Pc), and an area 3 (between Pc and Pd). The straight lines connecting together the reference point and the points of Pa, Pb, and Pc are denoted as Lab, Lbc, and Lcd, respectively. In the sub scanning direction, i.e., y direction, the increment of the amount of deviation in the area 1 is m1, that in the area 2 is m2-m1, and that in the area 3 is m3-m2. Herein, the areas have the lengths of L1, L2-L1, and L3-L2, respectively, along the main scanning direction. Using these area lengths and the increments in the areas, the linear lines Lab, Lbc, and Lcd can be each defined by the slope.

When the increment of the amount of deviation is positive in value, the scanning lines in the corresponding area are sloped toward the upper right, i.e., indicating +, and when the increment of the amount of deviation is negative in value, the scanning lines in the corresponding area are sloped toward the lower right, i.e., indicating –.

Image Processing Section 201

By referring to FIG. 2, described next is processes to be executed by the image processing section 201 in the image formation apparatus according to this embodiment.

In FIG. 2, the image generation section 203 generates bitmap image data available for print processing, based on print data supplied from a host device such as computer that is not shown. Herein, the print data is generally written by a printer description language called PDL (Page Description Language) for use to create page image data. The PDL often includes commands for rendering data, e.g., text, graphics, and images. Such print data is analyzed and subjected to a rasterizing process so that bitmap image data is generated.

When the bitmap image data generated by the image generation section 203 is image data of a RGB color space, and when an input to the image formation section 202 is image data corresponding to four colors of toner, Y,M,C,K, a color conversion section 204 executes a color conversion process. That is, by referring to a lookup table, the color conversion section 204 converts the RGB color space image data into CMYK color space image data by interpolation operation.

A halftone processing section 206 executes a process of reducing the number of gradation levels of input pixel data using a predetermined screen pattern designated through a UI operation section 211. The image formation section 202 is often available to receive only image data of low gradation level, e.g., 2, 4, and 16 gradation levels. As such, for the aim of enabling the stable halftone representation in such an image formation section 202 available to receive only image data of low gradation level, the number of gradation level is reduced by the halftone processing section 206. More specifically, the halftone processing section 206 performs a pseudo halftone process which is of converting the image data from pixel-basis gradation representation to area-basis gradation representation, and stores the result, i.e., bitmap image data, into a bitmap memory 208 for each of colors. The bitmap memory 208 is the one provided to temporarily store therein raster image data for use for the print process. The bitmap memory 208 can be configured by a page memory for storing image data of a page, or a band memory for storing data of a plurality of lines.

When the image generation section 203 generates bitmap image data, generated at the same time is attribute information, which indicates the type of image characteristics for each of the pixels. The attribute information is used to identify the type of data according to the image characteristics. For example, the attribute information includes a text attribute of character data or of data having the image characteristics thereof, image attribute of bitmap data or of data having the image characteristics thereof, and graphic attribute of draw data or of data having the image characteristics thereof. Adding such attribute information to pixels of a bitmap image allows the image processing suitable for the image characteristics of the respective attributes to be executed.

By utilizing such attribute information, a lookup table selection process can be executed for use in a color conversion section 204 when the image and text attributes are subjected to a color conversion process from RGB color space image data to CMYK color space image data.

The halftone processing section 206 can execute the halftone process using respective screens according to attributes. In this case, for a natural image of the image attribute, the halftone processing section 206 may use a screen with small number of lines to give priority over the gradation, and for characters of text attribute and for lines of the graphic attribute, the halftone processing section 206 may use a screen with large number of lines to give priority over the resolution.

In this embodiment, as will be described later, color shift correction sections 205A and 205B are selectively used depending on the detected amount of color shift. Through selective use as such, it is possible to determine whether to perform correction of color shift before or after the halftone process. Based on the control exercised by a color shift correction control section 207, these color shift correction sections correct any color shift caused by sloped or curved scanning lines. The processes to be executed by such color shift correction sections 205A and 205B will be described in detail later.

In a pulse width modulation (PWM) section 209, the bitmap image corrected for color shift is converted to have an exposure time allowed to be input to the scanner sections 24 in the image formation section 202.

Correction of Color Shift

Next, the color shift correction process (formation position correction process) according to this embodiment is described in detail. Note that the color shift correction process in this embodiment is similar to the process described in Japanese Patent Laid-Open No. 2004-170755.

In FIG. 2, a reference numeral 212 denotes a color shift amount storage section equipped to the image formation section 202. The color shift amount storage section 212 stores therein color shift profile information 212C, 212M, 212Y, and 212K on a color basis for each of the areas 1, 2, and 3 shown in FIG. 5. The color shift profile information indicates the amount of deviation (amount of deviation of image formation position) in the sub scanning direction between the actual main scanning lines 502, which are those measured at a plurality of points (B, C, and D) described with reference to FIG. 5, and the ideal main scanning line 501. FIG. 6 is a diagram showing exemplary profile information stored in the color shift amount storage section 212. Note that the profile information is not this option in terms of format, and the information surely serves well as long as indicating the characteristics of the scanning lines, i.e., slope and curve.

The profile information 212C, 212M, 212Y, and 212K can be acquired in many ways for storage in the color shift amount storage section 212. For example, by using the above-described color shift detection sensors 41a, 41b, 41c, and 41d, the slope of the scanning lines can be defined based on the detection result about the patches 402 formed on the intermediate transfer body 28. Alternatively, the profile information may be acquired by measuring the amount of deviation in the process of manufacturing the image formation apparatus. Still alternatively, the profile information may be acquired from information in an electronic form by outputting charts for measurement of the color shift by means of the image formation apparatus and then converting the output image into electronic information.

In FIG. 2, a color shift correction amount calculation section 210 calculates the amount of correction needed to cancel out the color shift, based on the profile information 212C, 212M, 212Y, and 212K stored in the color shift amount storage section 212 and engine profile information 213, and forwards the result to the color shift correction sections 205A and 205B and the color shift correction control section 207.

Described now are the specific details of a computation to be performed by the color shift correction sections 205A and 205B.

Assuming that coordinate data in the main scanning direction is x (dot), and the correction amount of color shift in the sub scanning direction is $\Delta y$ (dot), the correction amount $\Delta y$ in the areas 1, 2, and 3 shown in FIG. 5 can be derived by the following operation expression where there solution for image formation is r (dpi).

$$\text{Area 1}: \Delta y1 = x \times (m1/L1) \quad (1)$$

$$\text{Area 2}: \Delta y2 = m1/r + (x-(L1/r)) \times ((m2-m1)/(L2-L1)) \quad (2)$$

$$\text{Area 3}: \Delta y3 = m2/r + (x-(L2/r)) \times ((m3-m2)/(L3-L2)) \quad (3)$$

As shown in FIG. 5, the reference characters L1, L2, and L3 denote, respectively, the lengths (mm) along the main scanning direction from the reference point A to the points B, C, and D. The reference characters m1, m2, and m3 denote, respectively, the amounts of deviation, at the right end points (Pb, Pc, and Pd) in the respective areas 1, 2, and 3 between the ideal scanning line 501 and the actual scanning lines 502.

Herein, the engine profile information 213 is configured to include information about the amount of offset from a reference point corresponding to the paper size, information about the scanning direction of beams for each color, and information about the conveying speed of a printing medium. When the scanning direction varies, the amount of correction is required to be coded depending on which scanning direction. When the scanning direction found in the engine profile information 213 is a forward direction, the coding is negative, and the coding is positive if with a backward direction. With such coding, the color shift correction amount calculation section 210 calculates the amount of correction. When the conveying speed of a printing medium (print speed) varies, the color shift correction amount calculation section 210 can control the amount of correction depending on the print speed. Considered here is a case where the image formation speed is a half of the normal speed. In this case, with the scanning speed remained the same, the image output is performed with one scanning operation out of two, and not to perform image output with the remaining scanning operation, the amount of correction is set to a half of the case with the normal speed.

Based on the amount of correction calculated for respective pixels by the color shift correction amount calculation section 210, the color shift correction sections 205A and 205B accordingly correct the bitmap data.

Configuration of Color Shift Correction Sections 205A and 205B

Figure 7:
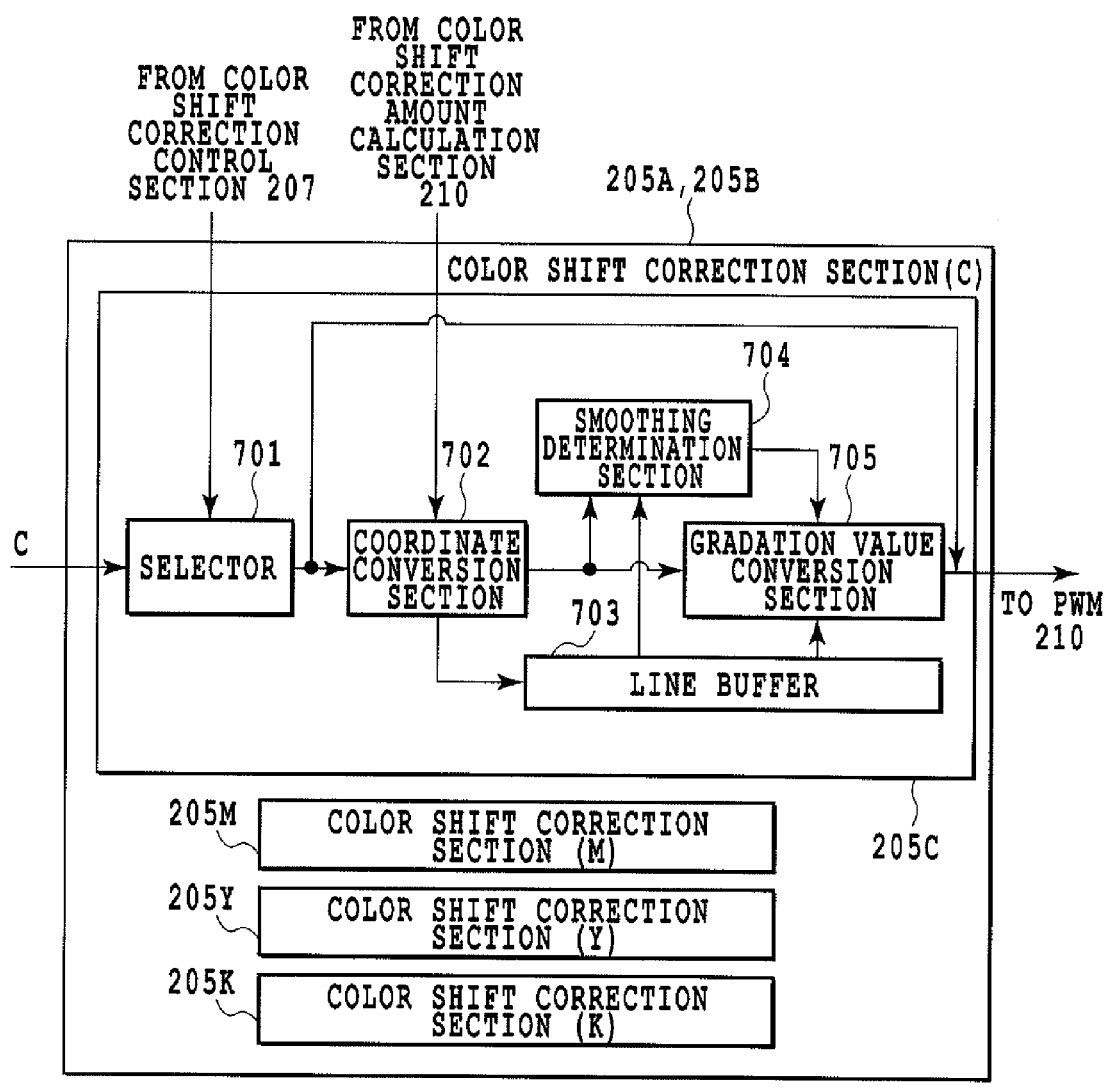
FIG. 7 is a block diagram showing the configuration of a color shift correction section.

FIG. 7 is a block diagram showing the configuration of the color shift correction sections 205A and 205B according to this embodiment. The correction of color shift is performed for each of the colors (C, M, Y, K) by the corresponding color shift correction section 205C, 205M, 205Y, or 205K. Not to repeat the same description, exemplified is the color shift correction section (C) 205 for the color of cyan (C) to describe the details of the color shift correction section. The remaining color shift correction sections 205M, 205Y, and 205K are assumed to be configured similarly, and to execute the similar processes.

The color shift correction section 205C is configured to include a selector 701, a coordinate conversion section 702, a line buffer 703, a smoothing determination section 704, and a gradation value conversion section 705. The line buffer 703 is a line memory used for storing image data before the color shift correction process, which is provided by the color conversion section 204 or the bitmap memory 208. The line memory can store, on a line basis, information corresponding to the amount of correction.

As will be described later by referring to FIG. 15, the selector 701 makes a switch between the color shift correction sections 205A and 205B based on a control signal supplied by the color shift correction control section 207, to determine as to which section performs the correction of color shift. The coordinate conversion section 702 is in charge of reconstructing the output image data, based on the data about the coordinate positions in the main and sub scanning directions and the amount of correction $\Delta y$ provided by the color shift correction amount calculation section 210. More specifically, the coordinate conversion section 702 executes the correction process to an integer part of the amount of correction $\Delta y$, i.e., performs correction of color shift on a pixel basis, so that the output image data is reconstructed. On the other hand, the gradation value conversion section 705 corrects the amount of deviation for a fractional part of the amount of correction $\Delta y$. With the process by the coordinate conversion section 702 and the process by the gradation value conversion section 705, the color shift is accordingly corrected.

Correction Process in Coordinate Conversion Section 702

Figure 8A:
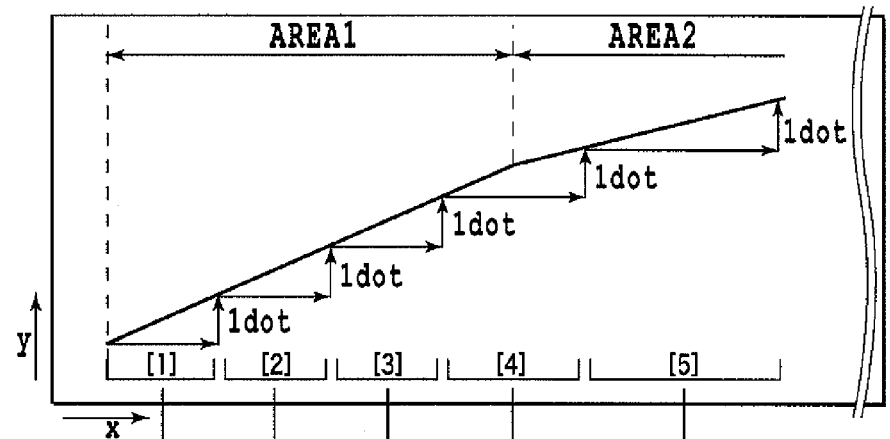
FIGS. 8A to 8C are diagrams for illustrating the details of a correction process executed in a coordinate conversion section.
Figure 8B:
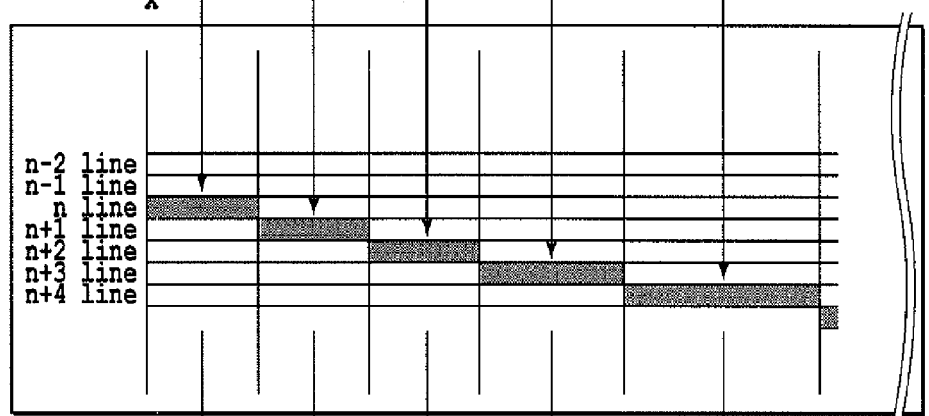
Figure 8C:
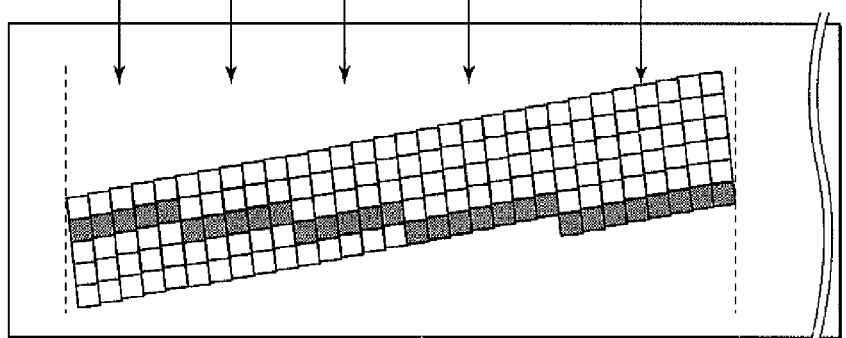

FIGS. 8A to 8C are diagrams illustrating the details about the correction process in the coordinate conversion section 702. The coordinate conversion section 702 makes offsets to coordinates of the image data stored in the bitmap memory 208 in the sub scanning direction, in accordance with the integer part of the amount of correction Δy, which is calculated from the amount of color shift observed in the linearly-approximated scanning line shown in FIG. 8A.

As shown in FIG. 8B, for example, on reconstructing data of the coordinate position at the n-th line in the sub scanning direction, the amount of correction Δy is equal to or larger than an equivalent of 0 pixel and smaller than an equivalent of 1 pixel in a partial area [1] in the main scanning direction. With this being the case, the coordinate conversion section 702 reads the data of n-th line as it is from the bitmap memory 208.

In a partial area [2] in the main scanning direction, the amount of correction Δy is equal to or larger than an equivalent of 1 pixel but smaller than an equivalent of 2 pixels. In this case, this partial area is entirely subjected to coordinate conversion in such a manner as to read the bitmap image at the one-line-offset position, i.e., the data of n+1-st line from the bitmap memory 208. Similarly, a partial area [3] is subjected to coordinate conversion in such a manner as to read the data of n+2-nd line, and a partial area [4] to read the data of n+3-rd line.

FIG. 8C shows light-exposure images of the image data exposed to an image carrier, which data is the one through with correction on a pixel basis by the coordinate conversion section 702. In the light-exposure images in the partial areas [1] to [5], the light-exposure positions are so offset as to be substantially a horizontally-straight line corrected for the slope (FIG. 8A) of a color shift occurred in the respective partial areas.

Correction Process Performed in Units Smaller than Pixel by Gradation Value Conversion Section 705

Described next is a correction process performed in units smaller than a pixel by the gray conversion section 704, i.e., the process of correcting the fractional part of the amount of correction Δy. FIGS. 9A to 9F are diagrams illustrating this correction process. The correction of the fractional part of the deviation amount is performed by adjusting the gradation value of pixels preceding and subsequent to an object pixel in the sub scanning direction.

FIG. 9A shows an exemplary scanning line directed toward the upper right. FIG. 9B shows a bitmap image of a horizontally-straight line before the gradation value conversion. FIG. 9C shows an image being a result of correcting the bitmap image of FIG. 9B which is obtained through the correction by the coordinate conversion section 702 for canceling out the color shift caused by the sloped scanning line of FIG. 9A as described above.

The gradation value conversion section 705 adjusts the gradation values of pixels preceding and subsequent to the object pixel in the sub scanning direction. FIG. 9D shows a gradation value conversion table showing the relationship between the amount of correction Δy and a correction coefficient for use for gradation value conversion. In the table, a parameter k denotes an integer of the amount of correction Δy (round down the fractional portion), i.e., the amount of correction on a pixel basis in the sub scanning direction. The parameters β and α (the following equations (4) and (5)) are correction coefficients for correction in units smaller than a pixel in the sub scanning direction, and indicate a distribution ratio of the gradation values of the pixels preceding and subsequent to the object pixel in the sub scanning direction based on the information about the fractional part of the amount of correction Δy.

$$\beta = \Delta y - k \quad (4)$$

$$\alpha = 1 - \quad (5)$$

where α denotes a distribution ratio of a pixel preceding to the object pixel, and β denotes a distribution ratio of a pixel subsequent to the object pixel.

FIG. 9E shows a bitmap image as a result of the gradation value conversion, which adjusts the gradation value ratio of the pixels preceding and subsequent to the object pixel in the sub scanning direction, in accordance with the coefficients in the gradation value conversion table. FIG. 9F shows a light-exposure image, exposed to the image carrier, of the bitmap image through with gradation value conversion as such. As shown in the figure, the image formed based on this light-exposure image looks like substantially a horizontal straight line with the slope cancelled out in the main scanning line.

A pattern image such as fine image is not preferably subjected to correction in units smaller than a pixel from a viewpoint of image quality. In the case of the pattern image, as shown in FIG. 10A, the correction process in the gradation value conversion section 705 may be executed with a parameter setting, in which in the gradation value conversion table, the distribution ratio of the gradation values of the pixels preceding and subsequent to the object pixel in the sub scanning direction may be set as the parameter β=0 and the parameter α=1. With such a parameter setting, any correction of color shift in units smaller than a pixel is made ineffective irrespective of the computation result derived by the color shift correction amount calculation section 210. FIG. 10B is a diagram showing a bitmap image through with coordinate conversion on a pixel basis in the sub scanning direction based on the data of an integer of the amount of correction Δy, and FIG. 10C is a light-exposure image of the bitmap image on the image carrier. The image formed based on this light-exposure image looks like substantially a horizontal straight line with the slope cancelled out in the main scanning line.

The smoothing determination section 704 makes a determination which image is to be subjected to the correction of color shift in units smaller than a pixel and which image is not. For such a determination by the smoothing determination section 704, images are subjected to edge detection through pattern matching comparison between n×m window data provided by the line buffer 703 and the edge pattern information of an edge pattern storage table that is not shown. Then, based on the detection result, the images are each determined whether being an edge portion image or not. The edge portion image is subjected to the process of the gradation value conversion section 705. Specifically, based on the determination made by the smoothing determination section 704, a gradation value conversion table selection section (not shown) selects either the gradation value conversion table of FIG. 9D or that of FIG. 10A. Based on the selected gradation value conversion table, the gradation value conversion section 705 executes the correction process.

Described next is the influence of the correction of color shift when such a color shift correction process is executed before the halftone process, and the influence thereof after the halftone process.

Correction of Color Shift Before Halftone Process

FIGS. 11A to 11D and FIGS. 13A to 13D are each diagrams illustrating a case where the halftone process is executed after the color shift correction process. FIGS. 11A to 11D each shows the case with less amount of color shift, and FIGS. 13A to 13D each shows the case with larger amount of color shift. FIGS. 11A and 13A each show an image having the constant density of 50%. When the images of FIGS. 11A and 13A are subjected to coordinate conversion by the coordinate conversion section 702, the resulting images are obtained as shown in FIGS. 11B and 13B, respectively.

When these images are subjected to the halftone process, the resulting images are obtained as shown in FIGS. 11C and 13C, respectively. Then, based on the images of FIGS. 11C and 13C, the images actually represented as the light-exposure images on an image carrier look are shown as that in FIGS. 11D and 13D, respectively.

As shown in FIG. 11D, with less amount of a color shift, the angle deviation in the screen pattern is not annoying that much. On the other hand, as shown in FIG. 13D, with larger amount of a color shift, the angle in the screen pattern becomes considerably different from the original angle.

Color Shift Correction Process after Halftone Process

Figure 12A:
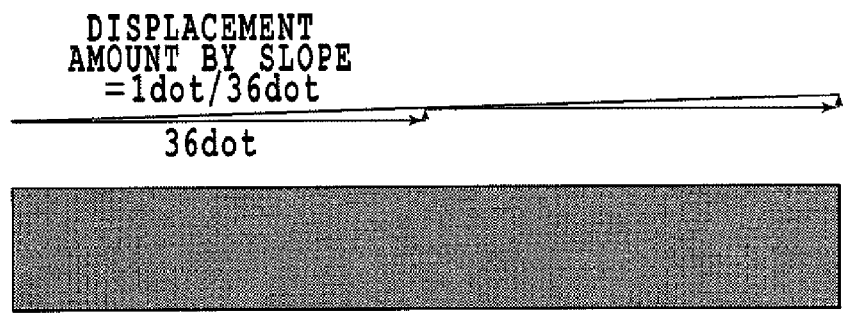
FIGS. 12A to 12D are diagrams showing an exemplary bitmap image corrected for color shift after the halftone process when the color shift is not that much conspicuous.
Figure 12B:

FIGS. 12A to 12D and FIGS. 14A to 14D are diagrams illustrating a case where the color shift correction process is executed after the halftone process. FIGS. 12A to 12D each shows the case with less amount of a color shift and FIGS. 14A to 14D each shows the case with larger amount of a color shift. FIGS. 12A and 14A each shows an image having the constant density of 50%. When the images of FIGS. 12A and 14A are subjected to the halftone process using a specific 4×4 halftone pattern (screen pattern), the resulting images are obtained as shown in FIGS. 12B and 14B, respectively.

Figure 12C:
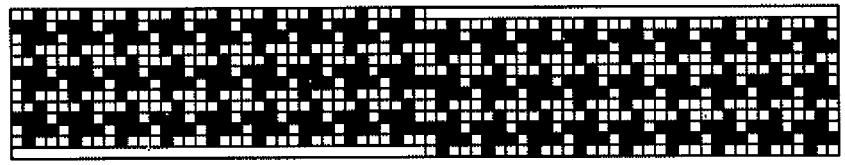
Figure 12D:
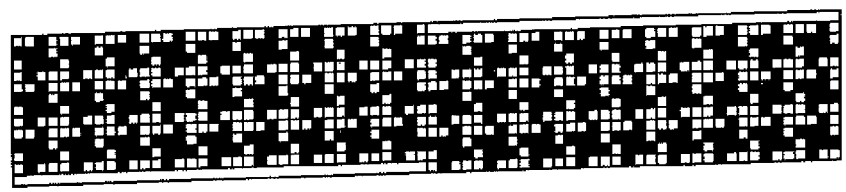

When the images of FIGS. 12B and 14B are subjected to coordinate conversion by the coordinate conversion section 702, the resulting images are obtained as shown in FIGS. 12C and 14C, respectively. Further, the light-exposure images actually formed on an image carrier based on the images of FIGS. 12C and 14C are shown as that in FIGS. 12D and 14D, respectively. As shown in these drawings, although the angle of the screen pattern is almost the same as the original angle, in the case of image shown in FIG. 14D, there is no periodicity of dither in some portions. As a result, moiré occurs as described in the foregoing.

As described above, images are degraded differently depending on whether to perform the correction of color shift before or after the halftone process. This becomes evident especially when the color shift is conspicuous. The image degradation as a result of not being able to keep the number of screen lines in the case that the correction of color shift is performed before the halftone process looks more conspicuous than the case with moiré when the color shift is corrected after the halftone process. From this point of view, in this embodiment, a determination is made whether to execute the color shift correction process before or after the halftone process. This determination is made based on the amount of color shift, which serves as a factor affecting the image quality. That is, when the color shift is large, as described above, the image degradation as a result of not being able to keep the number of screen lines in the case that the correction of color shift is performed before the halftone process looks more conspicuous. In consideration thereof, the correction of color shift is to be performed after the halftone process.

More specifically, in this embodiment, based on the amount of color shift calculated by the color shift correction amount calculation section 210, the color shift correction control section 207 determines whether to perform the correction of color shift before or after the halftone process.

Figure 15:
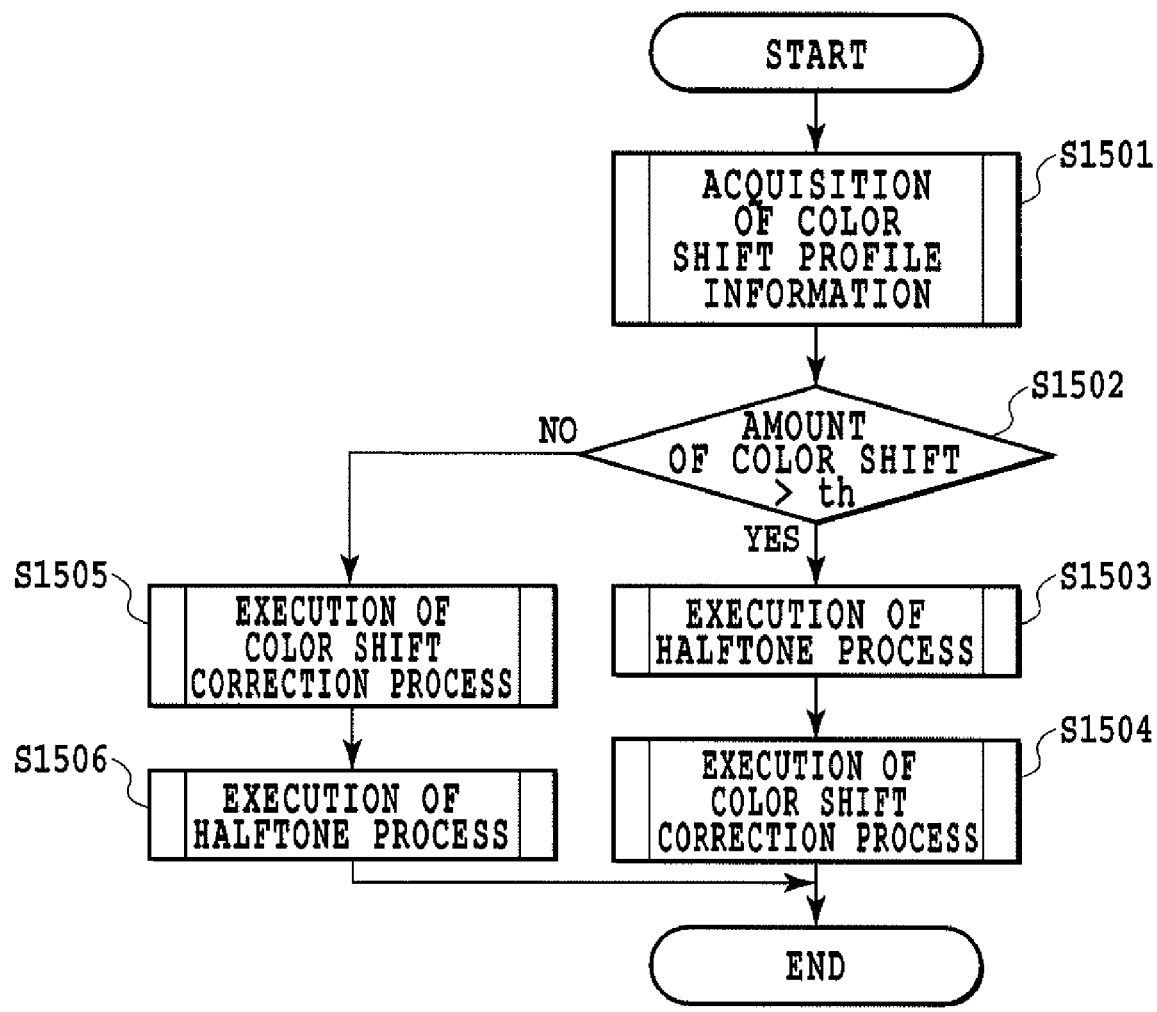
FIG. 15 is a flowchart of a color shift correction process according to a first embodiment of the invention.

FIG. 15 is a flowchart showing the color shift correction process to be executed, under the control of a CPU (not shown), by the halftone processing section 206, the color shift correction sections 205A and 205B, the color shift correction control section 207, and the color shift correction amount calculation section 210.

First, the color shift profile information is acquired from the color shift amount storage section 212, and the color shift correction amount calculation section 210 calculates the amount of color shift (S1501). Next, in the color shift correction control section 207, a determination is made whether to execute the color shift correction process before or after the halftone process (S1502). When the amount of color shift is determined as larger than a threshold value (th) as a predetermined value in step S1502, the halftone process is first executed (S1503), then the color shift correction process is executed (S1504), and the process is ended. That is, selected is the correction process by the color shift correction section 205B.

On the other hand, when the amount of color shift is determined as smaller than the threshold value (th) in step S1502, the color shift correction process is first executed (S1505), then the halftone process is executed (S1506), and the process is ended. That is, selected is the correction process by the color shift correction section 205A.

According to the present embodiment, a determination is made whether to execute the color shift correction process before or after the halftone process based on the amount of color shift. This favorably achieves a satisfactory image formation process while suppressing a phenomenon of angle deviation observed in a screen pattern to the minimum during the correction of color shift.

Second Embodiment

In the first embodiment, the amount of color shift is used as a basis to determine whether to perform the correction of color shift before or after the halftone process. In a second embodiment, resolution information provided as a factor affecting the image quality is used as a basis to determine whether to perform the correction of color shift before or after the halftone process.

As the output resolution is increased, it is generally desirable to increase the accuracy of any additional correction process, which for example includes filtering process such as edge detection and smoothing, for the color shift correction process after the halftone process. Especially the accuracy becomes significant when a halftone area is subjected to edge detection by pattern matching or others. On the other hand, if the filtering process is performed before the halftone process, the edge portion can be detected with accuracy utilizing the attribute information. That is, the filtering process is affected by the correction of color shift. On the other hand, the filtering process is generally required to be executed with higher accuracy when the image is high in output resolution. Accordingly, if with the larger output resolution, when the image data through with the halftone process is corrected for color shift, the conversion of output coordinates accompanying therewith or others prevents the filtering process from increasing in accuracy.

In the second embodiment, the output resolution is used as a basis to determine, for execution, whether to perform the correction of color shift before or after the halftone process.

Figure 16:
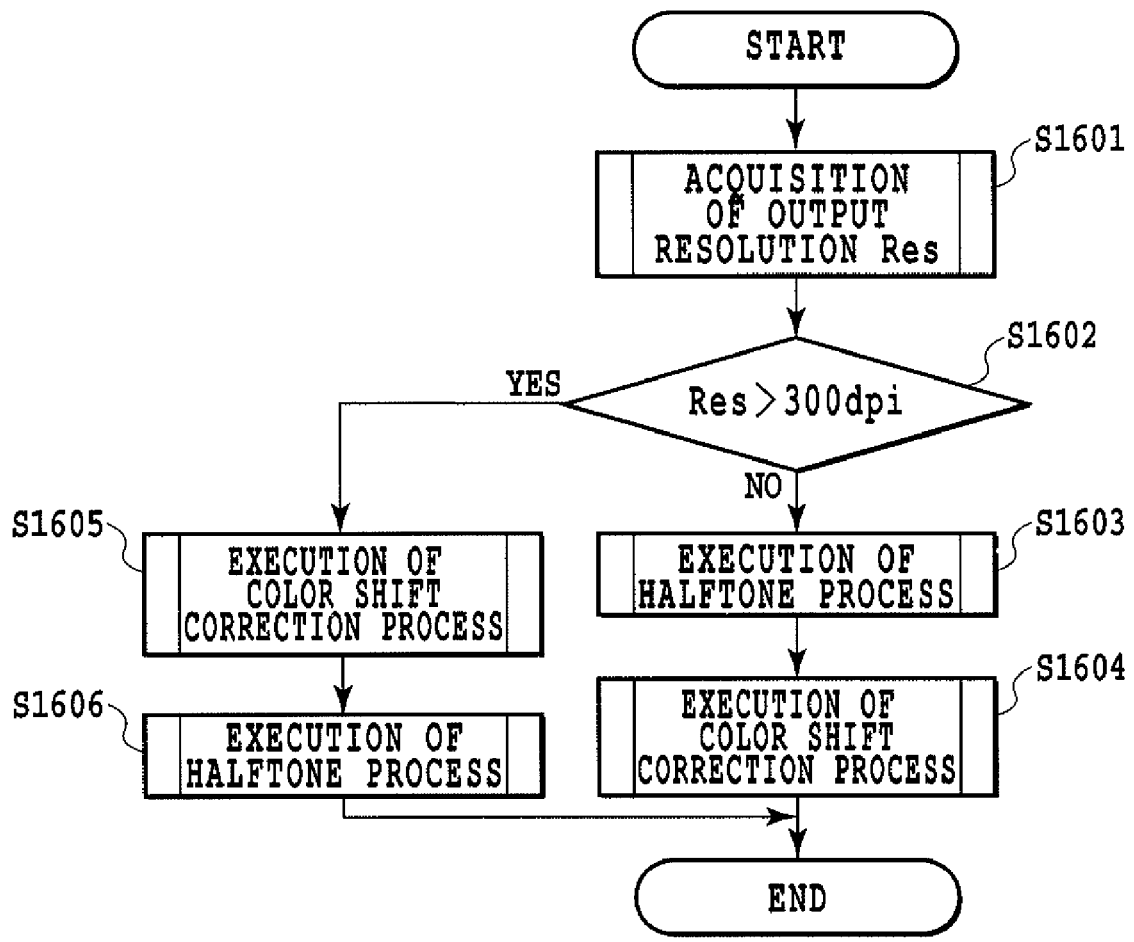
FIG. 16 is a flowchart of a color shift correction process according to a second embodiment of the invention.

FIG. 16 is a flowchart showing the color shift correction process to be executed, under the control of a CPU that is not shown, by the halftone processing section 206, the color shift correction sections 205A and 205B, the color shift correction control section 207, and the UI operation section 211.

First, acquired is an output resolution provided via the UI operation section 211 (S1601). Thereafter, a determination is made whether the output resolution is larger than 300 DPI (S1602). Note that the output resolution in this embodiment can be set to 300 DPI, 600 DPI, 1200 DPI, and 2400 DPI.

When the output resolution is 300 DPI, the halftone process is executed (S1603), then the color shift correction process is executed (S1604), and the process is ended. That is, selected is the correction process by the color shift correction section 205B.

On the other hand, when the output resolution is determined as larger than 300 DPI in step 1602, the color shift correction process is executed (S1605), then the half tone process is executed (S1606), and the process is ended. That is, selected is the correction process by the color shift correction section 205A.

According to the second embodiment, the output resolution is used as a basis whether to execute the color shift correction process before or after the halftone process. This favorably enables to execute filtering such as edge detection with the accuracy matching the output resolution even if the correction of color shift is performed.

Third Embodiment

The image formation system described as above has become capable of data storage in to a bitmap memory in the halftone level for the aim of speed increase and memory saving. For example, to derive output images of high quality, data storage into a bitmap memory may be made in a continuous gradation level, which is not yet through with the halftone process. On the other hand, to achieve output images at high speed, data storage into a bitmap memory may be made in a halftone level. If with data storage in the halftone level, the memory capacity can be reduced depending on the number of bits per pixel through with the halftone process. When 8-bit information is stored for each color of R,G,B, a pixel carries 24 bits. If with the 1-bit halftone process, a pixel may have 3-bit information so that the memory can be saved to one eighth.

In consideration thereof, in the third embodiment of the present invention, the number of gradation levels related to a rendering process for expanding an image to raster data, is used as a factor affecting the image quality. Based on this factor, a determination is made whether to execute the color shift correction process before or after the halftone process. More specifically, the rendering process in this embodiment is selectively executed to either the halftone-processed image data or not-yet-halftone-processed image data based on determination as to whether the image quality comes first for the output image, or the speed increase and the memory saving come first therefor. The correction of color shift is performed in accordance with a mode in the rendering process. When the image quality comes first for the mode, the correction is accordingly performed. That is, the correction can suit the mode whether it is performed before or after the halftone process.

When the number of gradation levels represented by the halftone process is 4, the rendering process in this embodiment is performed with a continuous gradation (8 bits) with priority over the image quality. When the number of gradation levels represented by the halftone process is 1 or 2 bits, the rendering process in this embodiment is performed with priority over the speed increase and the memory saving.

Figure 17:
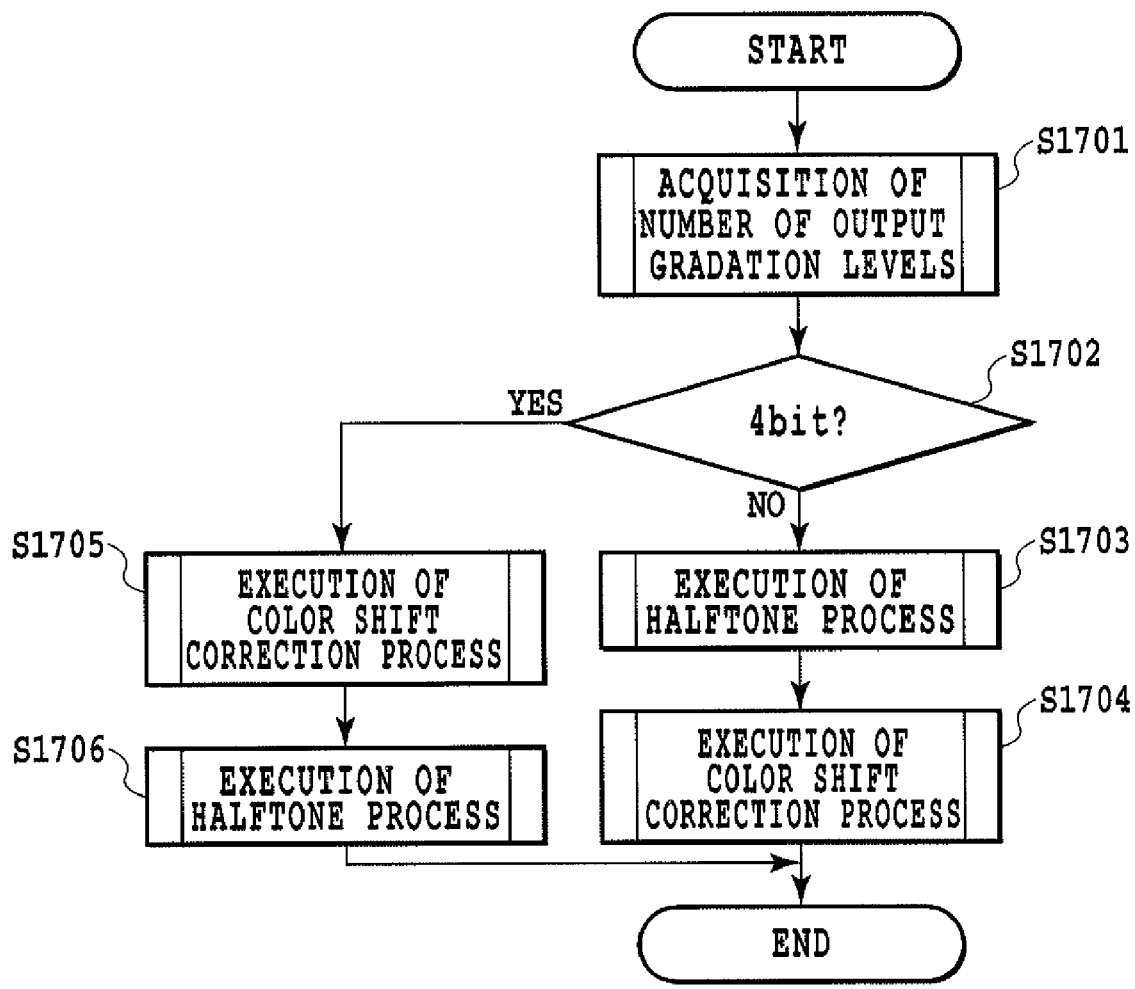
FIG. 17 is a flowchart of a color shift correction process according to a third embodiment of the invention.

FIG. 17 is a flow chart showing a color shift correction process to be executed, under the control of a CPU that is not shown, by the halftone processing section 206, the color shift correction sections 205A and 205B, the color shift correction control section 207, and the UI operation section 211.

First, the number of gradation levels of the halftone process, i.e., the number of gradation levels for output, is acquired via the UI operation section 211 (S1701). Thereafter, a determination is made whether the number of gradation levels for output is 4 bits or not (S1702). When the number of gradation levels is not 4 bits, it is determined that the rendering is performed with priority over the speed increase and the memory saving, and the halftone process is executed (S1703). The color shift correction process is then executed (S1704), and the process is ended. As such, with the speed increase comes first for image formation, the number of gradation levels achieved by the halftone process is small in number so that the image quality is not degraded that much even with correction of color shift after the halftone process. In consideration thereof, the correction of color shift is performed after the halftone process. That is, selected is the correction process by the color shift correction section 205B.

On the other hand, when the number of gradation levels for output is determined as 4 bits in step S1702, it is determined that the rendering process is executed with priority over the image quality, and the color shift correction process is executed (S1705). The halftone process is then executed (S1706), and the process is ended. That is, selected is the correction process by the color shift correction section 205A. In this case, with the mode that the image quality comes first, the correction of color shift is executed before the halftone process, i.e., causes less image degradation.

According to the third embodiment, in the image processing system in which a switch is made to the rendering process in accordance with the number of gradation levels for output, a determination is made whether to execute the correction of color shift before or after the halftone process. Based on such a determination, the correction of color shift is performed in accordance with the image quality related to the rendering process so that the correction process can be executed in an appropriate manner.

Fourth Embodiment

In the first to third embodiments described above, a determination is made whether to execute the color shift correction process before or after the halftone process based on, respectively, the amount of color shift, the output resolution, and the number of gradation levels for output. In a fourth embodiment, when such a determination in the first to third embodiments is made at the same time, a priority level is set to determine whether to execute the color shift correction process before or after the halftone process.

In this embodiment, a priority is set as below. Amount of Color shift>Output Resolution>Number of Gradation Levels for Output.

Figure 18:
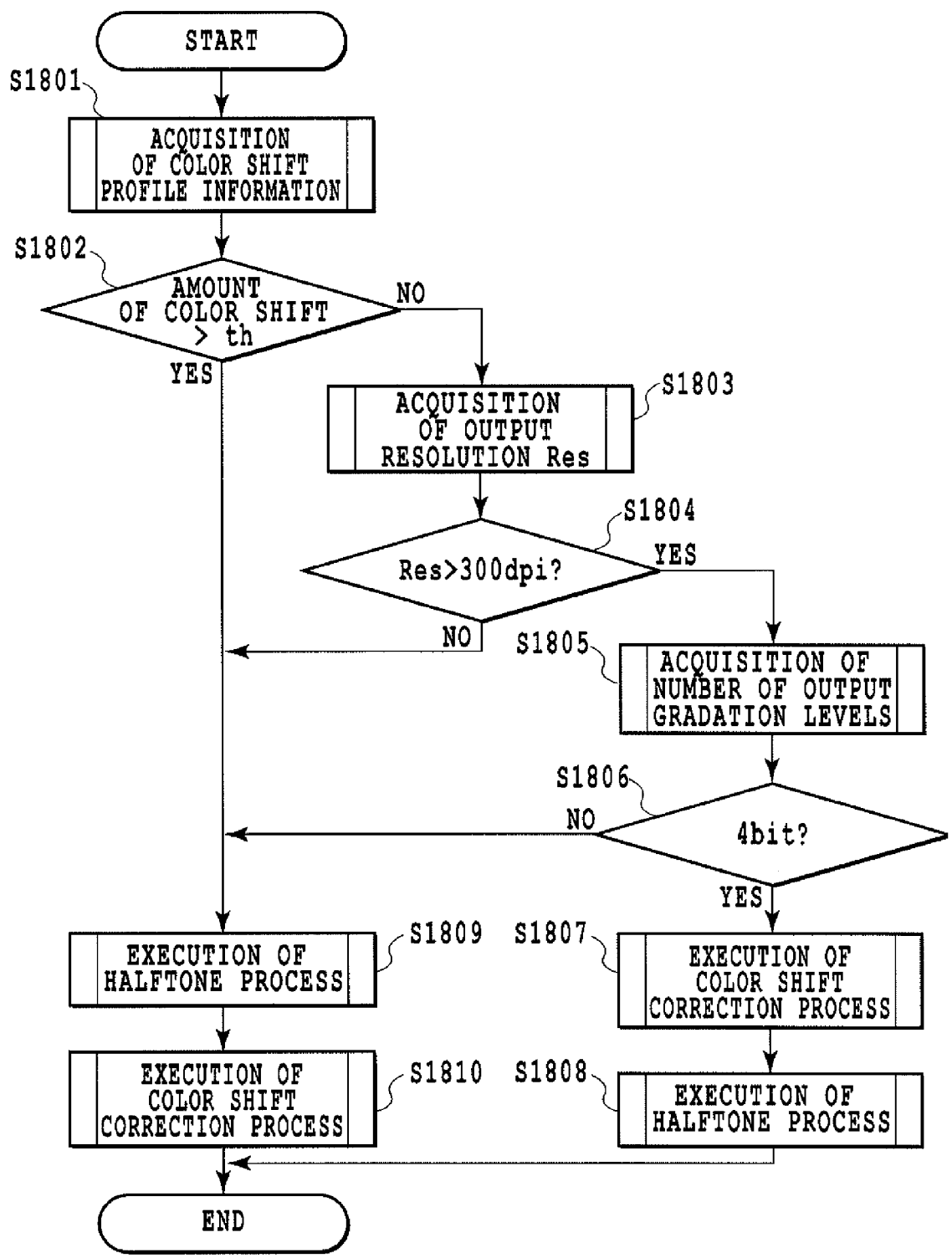
FIG. 18 is a flowchart of a color shift correction process according to a fourth embodiment of the invention.

FIG. 18 is a flowchart showing a color shift correction process to be executed, under the control of a CPU that is not shown, by the halftone processing section 206, the color shift correction sections 205, the color shift correction control section 207, and the UI operation section 211.

First, in step S1801, after the color shift profile information is acquired from the color shift amount storage section 212, the color shift correction amount calculation section 210 calculates the amount of color shift. Thereafter, the color shift correction control section 207 determines whether to execute the color shift correction process before or after the halftone process (S1802). When the amount of color shift is determined to be larger than a predetermined threshold value (th) in step S1802, the halftone process is executed (S1809). The color shift correction process is then executed (S1810), and the process is ended.

When the amount of color shift is determined to be equal to or smaller than the predetermined threshold value (th) in step S1802, the output resolution is acquired via the UI operation section 211 in step S1803, and a determination is made whether the output resolution is larger than 300 DPI or not (S1804) When the output resolution is determined as being equal to or smaller than 300 DPI in step S1804, the procedure goes to step S1809. On the other hand, when the output resolution is determined to be larger than 300 DPI in step S1802, the UI operation section 211 acquires the number of gradation levels for output in step S1805, and a determination is made whether the number of levels of gray for output is 4 bits or not (S1806).

When the number of gradation levels for output is determined not to be 4 bits in step S1806, the procedure goes to step S1809. On the other hand, when the number of gradation levels for output is determined to be 4 bits in step S1806, the color shift process is executed (S1807). The halftone process is then executed (S1808), and the process is ended.

According to the fourth embodiment, under the process control of color shift correction, a priority is used as a basis to determine whether to execute the color shift correction process before or after the halftone process. As such, the color shift correction process can be executed in an appropriate manner in accordance with the state of the system.

Another Embodiments

In the embodiments described above, described is the case where the invention is applied to color image formation using plural color materials. This is surely not restrictive, and the present invention is also applicable to monochrome image formation. That is, for correction of formation position in a case with a single development section, the description in the above embodiments is also applicable, i.e., execute the correction before or after the halftone process.

Further Embodiment

Further, the present invention is put into practice by executing program codes of software such as those shown in FIGS. 15 to 18, for example, which are supplied to a computer in an apparatus or a system connected to various devices to operate these devices so as to implement the functions of the above described embodiments, so that the various devices are operated in accordance with the programs stored in the computer (CPU or MPU) of the system or apparatus. In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-128509, filed May 2, 2006, which is hereby incorporated by reference herein in its entirety.

What is claimed is:

1. An image processing apparatus performing processes including a color shift correction process for correcting a color shift of image data, and a halftone process for quantizing image data, the apparatus comprising:
    an acquisition unit configured to acquire a value of factor that affects a quality of the image data;
    a determination unit configured to determine whether to execute the color shift correction process before or after the halftone process, based on the acquired value of factor; and
    a control unit configured to control the color shift correction process in accordance with the determination so that the color shift correction process is executed before or after the halftone process,
    wherein the value of factor corresponds to a color shift amount of the image, a resolution of image formation, and a number of gradation levels obtained through a quantization by the halftone process,
    wherein the determination unit performs determinations, in order, of whether or not each of the color shift amount of the image, the resolution of image formation, and the number of gradation levels obtained through a quantization by the halftone process is greater than a respective predetermined value,
    and wherein the control unit controls the color shift correction process in accordance with the determinations performed by the determination unit, so that the color shift correction process is executed before or after the halftone process.

2. An image processing apparatus as claimed in claim 1, further comprising a correction unit configured to execute the color shift correcting process after the controlling by the control unit.

3. An image processing method for performing processes including a color shift correction process for correcting a color shift of image data stored in a storage medium and a halftone process for quantizing image data, the method comprising:
    an acquisition step of acquiring a value of factor that affects a quality of the image data;
    a determination step of determining whether to execute the color shift correction process before or after the halftone process, based on the acquired value of factor; and
    a control step of controlling the color shift correction process in accordance with the determination so that the color shift correction process is executed before or after the halftone process,
    wherein the value of factor corresponds to a color shift amount of the image, a resolution of image formation, and a number of gradation levels obtained through a quantization by the halftone process,
    wherein the determination step performs determinations, in order, of whether or not each of the color shift amount of the image, the resolution of image formation, and the number of gradation levels obtained through a quantization by the halftone process is greater than a respective predetermined value,
    wherein the control step controls the color shift correction process in accordance with the determinations performed in the determination step, so that the color shift correction process is executed before or after the halftone process, and wherein at least one of the acquisition step, the determination step and the control step is performed by using at least one processor.

4. An image processing method as claimed in claim 3, further comprising a correction step of executing the color shift correcting process after the controlling in the control step.

* * * * *